United States Patent [19]

VanHulle et al.

[11] 4,223,943
[45] Sep. 23, 1980

[54] POSITIONING DEVICE FOR REMOVABLE VEHICLE ROOF PANELS

[75] Inventors: Gary L. VanHulle, Woodhaven; Richard D. George, Wyandotte; William A. Sims, Lincoln Park, all of Mich.

[73] Assignee: American Sunroof Corporation, Southgate, Mich.

[21] Appl. No.: 965,284

[22] Filed: Dec. 1, 1978

[51] Int. Cl.³ .............................................. B60J 7/18
[52] U.S. Cl. .................................... 296/224; 292/36; 292/337; 292/DIG. 5; 292/DIG. 55; 292/DIG. 60
[58] Field of Search ........... 296/137 B, 137 E, 137 H; 49/395, 394; 292/7, 36, 337, 218, DIG. 5, DIG. 60, DIG. 55

[56] References Cited

U.S. PATENT DOCUMENTS

| 813,595 | 2/1906 | Shive | 292/36 |
|---|---|---|---|
| 3,174793 | 3/1965 | Nallinger et al. | 296/137 B |
| 3,402,511 | 9/1968 | Lecomte | 296/137 H |
| 4,138,155 | 2/1979 | Chrysler | 296/137 B |

Primary Examiner—Robert R. Song
Attorney, Agent, or Firm—Basile, Weintraub & Hanlon

[57] ABSTRACT

An adjustable and releasable locking device for a removable vehicle roof panel is disclosed. A rotating lever longitudinally projects a pair of tapered pins which mate with apertures in the windshield post and headliner. The transverse and vertical position of the tapered pins is adjustable to position the panel relative to other parts of the vehicle and provide a smooth transition between the vehicle roof and the removable panel and provide an adequate seal between the vehicle and the removable panel.

7 Claims, 5 Drawing Figures

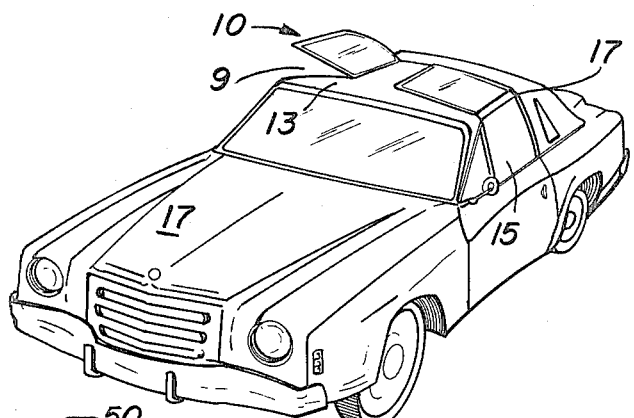
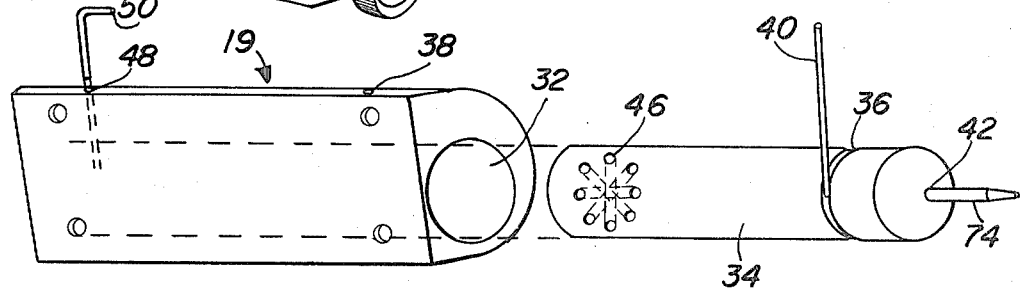
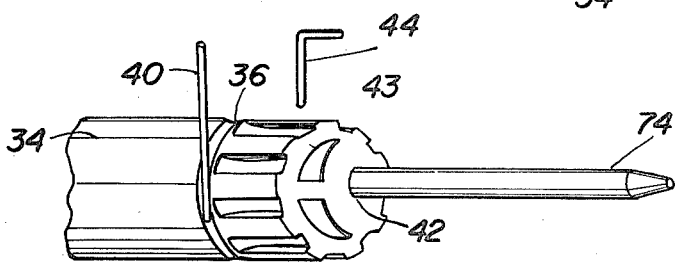
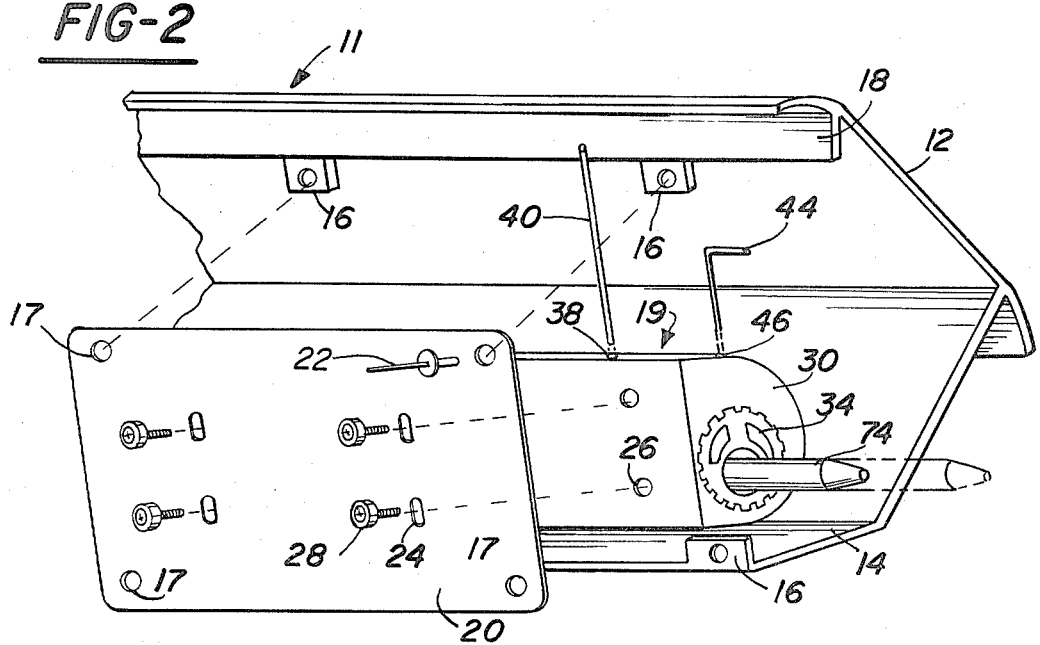

POSITIONING DEVICE FOR REMOVABLE VEHICLE ROOF PANELS

BACKGROUND OF THE INVENTION

I. Field of the Invention

The present invention relates to the field of removable roof panels, more particularly, the present invention concerns means for locking and locating the panel in the proper position relative to other parts of the vehicle. The present invention particularly relates to removable roof hatches having a drip cap at the side fitting over the glass in a door.

II. Prior Art Statement

The following U.S. Patents have been examined by the Applicant: Nos. 2,173,890; 2,882,093; 3,911,802; 3,913,970; 3,955,848; 3,972,558; 3,974,753; 4,005,901; and 4,021,073. These patents relate primarily to removable hatches hinged at one end or slidable hatches. U.S. Pat. Nos. 3,174,793, and 3,402,511 come the closest to the mechanism described in the present invention. U.S. Pat. No. 3,174,793 discloses a slidable roof locking structure including a pair of rods extending at an angle from the center of the roof structure toward the side of the slidable roof to provide a locking means. The rod ends engage a pair of mating apertures in the headliner on either side of the slidable roof to lock the roof into position. No provision is disclosed in this patent for aligning the slidable panel with the vehicle roof. U.S. Pat. No. 3,402,511 discloses a pivoting handle which moves a pair of rods in opposite directions to secure a sunroof panel to the vehicle roof. This patent does not disclose any means for adjusting the securing means to permit proper alignment of the sunroof with the remaining parts of the vehicle.

The aforementioned patents constitute the entire prior art relative to the present invention known to the Applicant.

SUMMARY OF THE INVENTION

The present invention relates to removable vehicle roof hatches or panels having adjustable means for aligning the removable panel with the vehicle structure to provide a streamlined and continuous line between the vehicle roof and the removable panel. The present invention include means to adjust the position of the removable panel to provide adequate pressure against the gaskets surrounding the periphery of the removable panel to provide an adequate seal against wind noise and water leakage.

In the preferred embodiment of the present invention a vehicle has a pair of openings cut over each of the front doors. The opening extends from the side of the vehicle over the door glass to almost the center of the vehicle. This leaves a narrow strip of roof to extend forward to the windshield providing structural support for the windshield and protection for the passengers in the vehicle in the event of a roll over. The vehicle doors do not have a frame surrounding the windows above the vehicle belt line. This provides an open appearance to the vehicle when the panels have been removed and the windows lowered. A "U" shaped support frame is fitted into each opening and attached to the vehicle roof. The support frame has a lower projecting lip extending into the opening which is spaced below the roof line and extends around the periphery of the "U". The projecting lip supports a gasket which is bonded to the lip around its periphery. The inner longitudinal bottom of the "U" shaped support member has an upper lip projecting over the gasket material toward the side of the automobile. A roof panel is squeezed between this lip and the gasket material below forming a seal along the inner horizontal edge of the panel. The removable panel is configured to follow the shape of the roof as the surface of the panel extends outward toward the door. Upon nearing the area above the door a cap is attached to the outer edge of the panel. The drip cap curves downward toward the door in an arcuate manner conforming to the shape of the roof to meet the top of the door glass. The drip cap, at its lower end, projects over the door glass a sufficient distance to provide a space for a gasket to seal the upper edge of the window. Spaced vertically upward from the bottom edge of the drip cap there is a bottom wall which projects angularly inward and downward toward the center of vehicle. The bottom wall terminates directly under the beginning of the upper wall of the drip cap. At this point the bottom wall turns upward to form a plurality of mounting tabs to which a positioning and locking device is attached. The adjustable means is located within the drip cap of the panel and includes a pair of opposed, outwardly projecting tapered pins which thrust into suitable apertures formed in the vehicle to lock the vehicle thereinto.

BRIEF DESCRIPTION OF THE DRAWINGS

The description herein makes reference to the accompanying drawings wherein like reference numbers refer to like parts throughout the several views and wherein;

FIG. 1 illustrates a perspective view of the present invention as installed on the roof of a vehicle;

FIG. 2 illustrates a broken, perspective view partly in phantom of a segmented portion of the drip cap of a roof panel of the present invention having the adjustable locking means installed therein;

FIG. 3 illustrates a perspective, exploded view of a bushing housing and bushing illustrating an assembly for adjustably locking the bushing in position;

FIG. 4 illustrates an alternate assembly for adjustably locking the bushing in position.

DESCRIPTION OF THE PREFERRED EMBODIMENT

Figure 5:
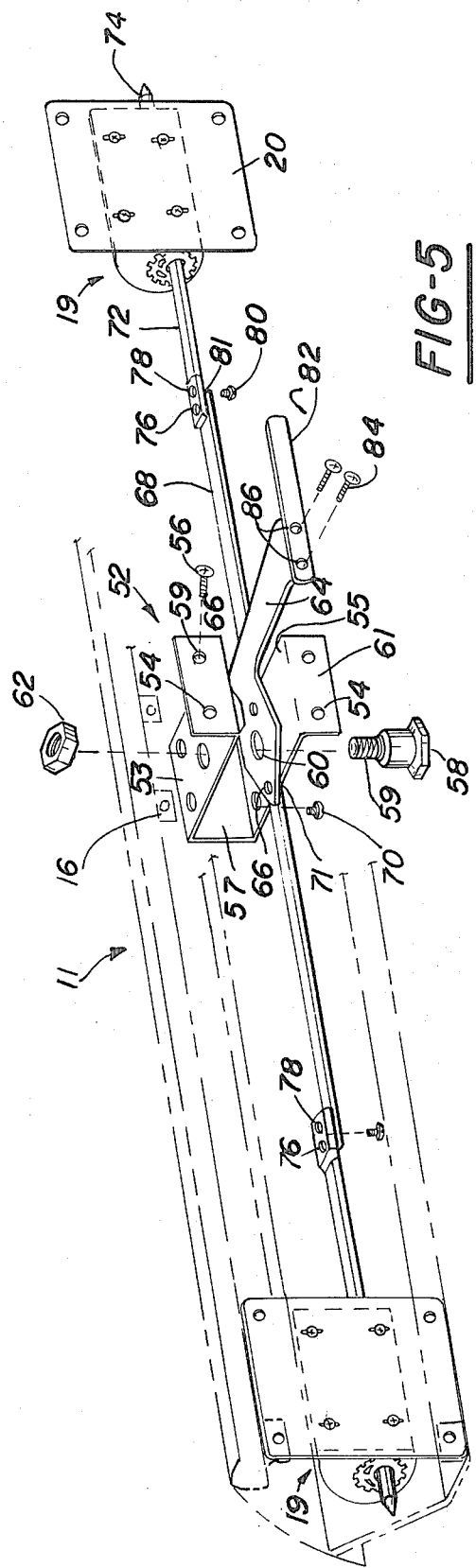
FIG. 5 illustrates a perspective view of the positioning and locking device as installed in a drip cap of a roof panel for use in an automobile.

Referring now to the drawings and in particular FIGS. 1 and 2 wherein there is illustrated a preferred embodiment of the present invention. FIG. 1 illustrates a perspective view of a removable roof panel at 10. In a first embodiment hereof a pair of opposed openings 9 are formed in the roof 13, over each front door 15 of a vehicle, the openings 9 extend inward toward the center of the vehicle roof. As noted, the present invention discloses a means for positioning and locking the panel 10 within the associated opening 9 over the glass of a front door 15 so that a water tight and air tight seal is provided and the hatch blends smoothly with the vehicle roof structure 13.

Referring now to FIG. 2 wherein there is illustrated a perspective view of the positioning and locking means which is mounted within a drip cap 11 of the removable vehicle roof panel 10. The drip cap 11 is made of a rigid material such as extruded aluminum, formed steel, or molded reinforced plastic. The drip cap 11 extends rearwardly, from its forward end, which is proximate the windshield post, to an abutting position with the headliner of the vehicle. A mounting flange 18 adapted to support a positioning and locking device 19 downwardly depends from the inner end of an outer wall 12 of the drip cap 11, as shown. The outer wall 12, at its lower end, overlaps the upper edge of the door glass. The outer wall 12 extends upward and inward toward the center of the vehicle in an arcuate manner to match the curvature of the roof line of the vehicle. The inner edge of the outer wall 12 ends a distance upward and inward from the edge of the car door glass.

A lower or bottotm wall 14 is integrally formed with the wall 12 and extends inwardly therefrom in an irregular pattern, as shown. A plurality of mounting tabs 16 extend vertically upward from the free edge of the lower wall 14 to provide a mounting for elements of the positioning and locking device 19. Additional mounting tabs 16 are fixedly attached to the mounting flange 18 along its length to provide additional mounting points for elements of the locking and positioning device 19.

A positioning device 19 is disposed at each end of the drip cap 11 as shown in FIG. 5. However to simplify the discription only one positioning and locking device 19 will be described hereinbelow.

As shown in FIG. 2, a plate 20 has a plurality of holes which align with a plurality of mating holes in mounting tabs 16. Each plate 20 is fixedly attached to the drip cap through the mounting tabs 16 by a plurality of rivets 22 or other suitable fastening means. The vertical plate 20 has a plurality of vertically elongated slots 24 which align with a plurality of associated threaded apertures 26 in a bushing housing 30. A plurality of threaded fasteners 28 threadingly engage the apertures 26, passing through the elongated slots 24, to mount the bushing housing 30 in a vertically adjustable manner to the vertical plate 20. As will be subsequently detailed, the bushing housing is vertically adjustable to compensate for manufacturing tolerances and allow the panel 10 to be aligned with the roof 13 and to thus enable proper alignment of the roof panel locking means 19.

As shown in FIGS. 2,4, and 5 the bushing housing 30 has a bore extending through its length to slidingly receive a bushing 34. A circumferential groove 36 is formed in the bushing 34. A aperture 38 in the bushing housing 30 is aligned to tangentially pass the circumferential groove 36. A pin 40 is slidingly received by the aperture 38. When the pin 40 is inserted into the opening 38, any longitudinal motion of the bushing 34 is prevented while rotation of the bushing 34 is permitted. A longitudinal bushing cylinder 42 is eccentrically displaced from the center of each bushing 34 and is mounted therewithin. A tapered first pin 72 is mounted to the bushing at the front end of the drip cap and a second tapered pin 74 is mounted to its associated bushing at the rear end of the drip cap. Rotation of the bushing 34 moves the position of the first or second tapered pins transversely for positioning and aligning the drip cap with requisite, pin receiving apertures not shown formed in the vehicle structure. Vertical alignment of the first and second tapered pins is provided by vertically moving the bushing housing 30 by moving its mounting screws 28 in the vertically elongated slots 24.

Once the desired position of the tapered pins has been established by rotating the bushing, the bushing 34 is locked into position by the following mode: A spline 43 extends a short distance circumferentially around the pin-carrying end of the bushing 34 (FIG. 4). A lock pin 44 is slidingly insertable into a lock aperture 46 formed in the housing 30. The lock pin 44 engages the teeth of the spline 43 to prevent further rotation of the bushing 34.

In FIG. 3 there is illustrated another mode of locking the bushing 34 to prevent rotation thereof. In connection herewith a plurality of opposed, registering apertures 46 lying in a common plane pass through the center of the bushing 34. An engaging aperture 48 aligns with any one of the opposing set of apertures 46, one at a time, to allow an engaging pin 50 to slidingly pass through the opposed apertures to lock the bushing from further rotation.

Referring now to FIG. 5 wherein there is illustrated a perspective view of the device for longitudinally moving the first and second tapered pins 72,74 respectively, in their respective longitudinal bushing bores 32 to lock the roof panel to the vehicle. A pivot support 52 formed from a single piece of metal is disposed within the drip cap, as shown. The support 52 has a pair of parallel spaced apart horizontal walls 53 and 55. The upper wall 53 and the lower wall 55 are joined together by a vertical rear wall 57. A first flange 59 turns upward at the free end of the upper wall and a second flange 61 turns downward at the free end of the lower wall. Each flange has a plurality of holes 54 which align with the apertures provided in associated mounting tabs 16. A plurality of screws or other fasteners 56 engage the threaded apertures in the tabs 16 passing through the apertures 54 to mount the pivot support 52 securely to the drip cap 11.

A pair of registering apertures 60 formed in the upper and lower wall respectively of the pivot support 52 receive a pivot 58. The pivot 58 includes a threaded extension which extends from the upper end of the pivot 58 through the opening 60 in the wall 53. The extension receives a threaded nut 62 to hold the pivot 58 in position.

A lever 64 is disposed between the walls 53,55 and is pivotally attached to the pivot 58. The lever 64 has a pair of apertures 66 on opposite sides of the central opening thereof through which the pivot 58 is inserted. A pair of opposed links 68, 68' are attached, to the lever 64 via link pins 70 which slidingly pass through the apertures 66 and a mating aperture formed at one end of each link 68, 68'.

The tapered pins 72 and 74 have their respective inner ends 76 flattened, as shown. Apertures 76,78 formed in each flattaned end are selectively aligned with a mating aperture 81 at the free end of each link 68,68'. Selecting aperture 76 or 78 allows variation in the projection of pins 72,74. Link pins 80 are inserted through the apertures 76 or 78 and 81 to pivotally connect the links 68,68' to their associated inner end of the pins 72 and 74.

A handle 82 is attached to the lever 64 by means of a plurality of screws 84. The screws 84 pass through a plurality of apertures 86 aligned with a plurality of threaded apertures in the lever 64 to fixedly attach the handle 82 to the lever 64. The handle 82 rotates the lever 64 to longitudinally move the first tapered pin 72 and the second tapered pin 74. The pins 72 and 74 are received or withdrawn from an appropriate associated aperture formed in the windshield post and headliner of the vehicle to either lock or release the roof panel in its opening (not shown).

A suitable interior cover (not shown) encloses the drip cap installation save for the handle to enhance the aesthetic appearance of the panel.

It is to be appreciated that the present invention enables easy adjustment and alignment of the thrusting tapered pins for easy installation of the roof panels hereof.

Having thus described our invention what we claim is:

1. A positioning and locking device for a removable vehicle roof panel comprising:

a first pin and a second pin, the pins being longitudinally movable in opposed directions;

the first pin being engageable with an aperture formed in a windshield post of a vehicle, the second pin being engageable in a second aperture formed in a headliner of a vehicle;

means for moving said first and second pins in the opposite directions;

a bushing for guiding and locating said first and second pins in a first direction; and a plate including slots for adjusting the location of said first and second pins in a second direction to enable alignment of the pins with their respective vehicle-associated apertures.

2. A positioning and locking device for removable vehicle roof panels as described in claim 1 wherein said means for moving said first and second pins in opposite directions comprises:

a lever pivotally interconnected to the pins, the lever being rotatable in a first direction to longitudinally extend the pins and being rotatable in a second direction to longitudinally withdraw the pins.

3. The device of claim 1 which further comprises means for locking the bushing for guiding and locating in position.

4. A positioning and locking device for removable vehicle roof panels as defined in claim 1 which further comprises:

a pair of bushing housings each having a longitudinal bore passing therethrough, each bushing housing having an aperture formed therein;

a pair of bushings, each one of said bushings being slidbly received within an associated one of said longitudinal bores, said bushings each having a circumferential groove formed therearound;

a pair of locking pins each one being insertable into an associated, aperture and tangentially into an associated groove, the locking pins preventing longitudinal motion of said bushings, a pair of plates fixedly attached to the panel, each plate being interconnectable to an associated bushing housing, for adjusting the location of the first and second pins in the second direction, and wherein each bushing bore slidingly receives and locates said first and second pins.

5. A positioning and locking device for removable vehicle roof panels as defined in claim 4 wherein:

said longitudinal bushing bores are eccentric with the center of said bushings, and rotation of the bushings positions the first and second pins in a transverse plane, the device further comprising:

means for locking said bushing to prevent rotation after the desired transverse position is reached.

6. A positioning and locking device for removable roof panels as defined in claim 5 wherein said bushing locking means comprises a spline formed on the outer diameter of said bushing at one end, a locking pin received in a vertical locking aperture in said bushing housing aligned to cause said lock pin to fit between the spline teeth preventing rotation.

7. A positioning and locking device for removable roof panels as defined in claim 5 wherein said bushing locking means comprises:

a plurality of crossing apertures in a common plane near one end of the said bushing, passing through said bushing, a locking aperture formed in the bushing housing, and an engaging pin received by said locking aperture and one of said crossing apertures to prevent rotation of said bushing.

* * * * *